(12) United States Patent
Museros Romero et al.

(10) Patent No.: US 11,493,403 B2
(45) Date of Patent: Nov. 8, 2022

(54) EXCITER SYSTEM FOR INDUCING VIBRATIONS IN RAILWAY BRIDGES

(71) Applicants: TELEFONOS, LINEAS Y CENTRALES, S.A., Alcobendas (ES); INSERAIL, S.L., Madrid (ES); FUNDACION CAMINOS DE HIERRO PARA LA INVESTIGACION Y LA INGENIERIA FERROVIARIA, Madrid (ES); UNIVERSITAT POLITECNICA DE VALENCIA, Valencia (ES)

(72) Inventors: Pedro Museros Romero, Valencia (ES); Manuel Cuadrado Sanguino, Madrid (ES); Paul Ibañez, Boukler, CO (US)

(*) Notice: Subject to any disclaimer, the term of this patent is extended or adjusted under 35 U.S.C. 154(b) by 0 days.

(21) Appl. No.: 17/053,761

(22) PCT Filed: May 8, 2019

(86) PCT No.: PCT/ES2019/070302
§ 371 (c)(1),
(2) Date: Nov. 7, 2020

(87) PCT Pub. No.: WO2019/215367
PCT Pub. Date: Nov. 14, 2019

(65) Prior Publication Data
US 2021/0215571 A1    Jul. 15, 2021

(30) Foreign Application Priority Data
May 9, 2018   (ES) ................ ES201800121

(51) Int. Cl.
*G01M 7/02*        (2006.01)

(52) U.S. Cl.
CPC ............ *G01M 7/022* (2013.01); *G01M 7/025* (2013.01); *G01M 7/02* (2013.01)

(58) Field of Classification Search
CPC ......... G01M 7/02; G01M 7/022; G01M 7/025
See application file for complete search history.

(56) References Cited

U.S. PATENT DOCUMENTS 6,321,657 B1 * 11/2001 Owen ................. B61B 1/02
                                                    104/119

FOREIGN PATENT DOCUMENTS

| JP | 2003315202 A | * | 11/2003 | |
| JP | 2004025991 A | * | 1/2004 | ............... B61K 9/08 |

* cited by examiner

*Primary Examiner* — Randy W Gibson
*Assistant Examiner* — John M Royston
(74) *Attorney, Agent, or Firm* — Legends Law Group, PLLC; Stephen H. Bean, Esq.

(57) ABSTRACT

The invention relates to a bridge exciter for inducing vibrations in railway or roadway bridges, which comprises a servo-hydraulic actuator connected to a wagon designed to transport the same over tracks or a road. The actuator generates a force by moving a variable-weight reaction mass guided by linear bearings. It comprises hydraulic equipment that enables direct transmission of the vibrations to the infrastructure, independent of the rolling gear of the wagon or the rubber-tired vehicle, via false wheels. The movement of the actuator piston is controlled by a computer allowing the actuator to apply general forces on a bridge or roadway that do not exceed the maximum acceptable displacement of the piston: harmonic, impulsive, and transient forces. The equipment is provided with the necessary load control elements.

5 Claims, 3 Drawing Sheets

EXCITER SYSTEM FOR INDUCING VIBRATIONS IN RAILWAY BRIDGES

FIELD OF INDUSTRIAL APPLICATION

The present invention relates to a dynamic railway bridge exciter which can be transported, is capable of exerting high forces, and can be modulated according to the type of bridge, preferably assembled in a wagon specifically designed for such use, which exciter, by means of a vertical hydraulic actuator, enables the generation of vibrations of variable and controlled intensity, frequency, and waveform with respect to the structure.

STATE OF THE ART

There are two main situations in which the dynamic behavior of a railway bridge is essential for evaluating its safety and functionality.

The first of said situations is the commissioning of a new work, subjected to high-speed traffic (V>200 km/h), capable of generating damaging vibrations in the structure if they are not suitably taken into account. Structural calculation during the project phase is performed based on certain hypotheses relative to the properties of the bridge and its materials, which are often verified for safety by means of a load test (prior to accepting the work). Particularly in Spain, this verification is compulsory according to Instruction on Technical Inspections in Railway Bridges (*Inspecciones Técnicas en los Puentes de Ferrocarril*—ITPF-05).

The second situation arises in light of the increased loads and/or speeds of a train passing over an already existing bridge. Due to the circulation of heavier and faster railway traffic, the structure may not be prepared to support higher levels of vibration. In such case, load tests are again required to verify the dynamic properties and evaluate the actual bearing capacity of the bridge. If said capacity is not sufficient, it will need to be refurbished or replaced, with the high costs derived therefrom. Infrastructure administrative entities have considerable interest in this sense given the continuous improvement of the rolling stock and the growing demands of transport.

Given the importance of dynamic behavior in both scenarios, some of the inventors of this application already developed an earlier utility model based on counter-rotating masses (reference U 201200785) for the purpose of reliably measuring:

Frequencies and mode shapes
Damping rates in different vibration modes

In particular, to measure the real damping, structure vibrations that are similar in intensity and duration to the passage of a railway are required, given that this can generate a non-linear response rendering methods based on environmental vibrations (for example, wind) or small manually transportable exciters rather unreliable. The passage of heavy railway axles opens/closes cracks and microcracks, mobilizes friction in the ballast, and of the ballast with the track, further deforms the supports, etc., said complex phenomena being responsible for the non-linearity. In this sense, tests based on recording the free vibration after the passage of trains are normally used, but the short duration thereof and the fact that not all the vibration modes are excited do not allow a complete structure characterization.

Therefore, utility model U201200785 was developed due to the limitations of the methods based on environmental vibration with manually transportable exciters or on free vibrations. However, the practical usefulness thereof is limited by two aspects: (I) the wide range of frequencies of interest, which ranges from very low values close to 2÷3 Hz to more than 30 Hz. The factor 15 between the highest and lowest frequency means that, in order to apply a force with constant amplitude in the entire range, the eccentricity of the counter-rotating apparatus must be increased by a factor $15^2=225$, which creates serious practical drawbacks that require either setting up in the wagon several counter-rotating engines with a narrower range of eccentricity, or creating an automatic eccentricity variation system which is complex and cost-prohibitive. Otherwise, the manual modification of eccentricity would make the test non-viable due to the long duration thereof. (II) The impossibility of using excitation functions that are not purely harmonic. This prevents characterizing the structure in light of loads of another type, for example, impulsive loads, which are important as they are representative of the high-speed passage of railway axles, and therefore are of considerable interest in high-speed lines.

To solve both difficulties and to provide the apparatus with the required functionality, it is therefore necessary to design an exciter based on a more versatile actuator than the counter-rotating actuator.

Korean patent with reference number KR101388079B1 describes a machine related to the present invention to a certain degree because it makes use of a piston-type actuator. However, its design is not suitable for testing railway bridges either due to the following reasons:

The machine described in patent KR101388079B1 is prepared to generate vibrations in the railway track, but not while being located on a bridge or viaduct, but in the track on an embankment. The fundamental difference lies in the fact that in the track on an embankment, the movement of the base of the machine will be essentially vertical, with very limited rotation, but in the case of a bridge the situation is clearly different.

Patent KR101388079B1 allows placing vibrating masses in the form of discs, which hang line a pendulum from the actuator. However, if said equipment is to be used in a bridge and the apparatus was located at any point of the structure in which movement was not purely vertical, the hanging masses would oscillate sidewise, damaging the actuator. A typical case would be a double-track bridge: placing the machine in one of the two tracks, in the center of the opening. In that case, the torsional oscillation would cause the lateral rolling of the masses, especially taking into account its significant elevation with respect to the plane of the rail. Something similar would happen even in single-track bridges if it were not used exclusively in the center of the opening or if skew were present.

The invention described in patent KR101388079B1 furthermore presents an additional problem since it is not prepared to be transported long distances along the track given that it only has small wheels that are only suitable for short displacements.

Moreover, the action of a train on a bridge presents a considerable pseudostatic component because loads always act downwards, and furthermore there is usually one or more loads on the structure (according to the span of the bridge). This causes the vertical displacement of the bridge to be similar to that of FIG. 3 upon passage of the train.

This effect is of special importance in bridges. FIG. 3 shows a TGV passing a 20-meter opening at 180 km/h. A clear mean value component indicated by the horizontal line (pseudostatic value equal to 0.8 mm) and causing the bridge to depart from its initial configuration (deformed by the actual weight alone) upon the entry of loads, is seen. Oscillation, which may even exhibit a resonant character depending on the speed, is created from then on: the characteristics of the response will be affected by the base pseudostatic value, since the latter determines the degree of opening of the cracks and microcracks, as well as the work of the supports at full load and at greater friction mobilization in the ballast layer.

To reproduce an effect of this type and to enable applying at the same time intense dynamic forces with an exciter, there is a need to be able to ballast same with a variable weight that is readily adapted to each bridge, a feature which is found in the machine to be patented herein.

Lastly, another novel aspect of using a hydraulic actuator instead of a counter-rotating actuator like in the earlier model U 201200785 is the possibility of installing a load cell between the actual plunger of the actuator and the frame of the wagon, to thereby obtain a direct measurement of the exerted force which is used for comparison and calibration purposes with respect to those obtained by the sensors arranged in the false wheels, a redundant measurement which will detect possible discrepancies and improve apparatus reliability thereby being achieved.

In summary, in the field of exciter systems for railway infrastructures, there is currently no suitable system for railway bridges which is capable of applying general forces, with an adjustable static component, and of suitably supporting lateral and torsional oscillations of the bridge. Utility model U 201200785 can only produce harmonic forces but not general impulsive or transient forces, and given the wide range of frequencies of interest, the eccentricity of the machine needs to be varied by a ratio of 255:1 which complicates both the construction and the operation thereof. Moreover, Korean patent KR101388079B1 cannot be used either because it would deteriorate due to the lateral/torsional oscillation of the bridge, requiring an actuator with masses that are guided by linear bearings. Furthermore, the apparatus in the Korean patent is not prepared for being ballasted, nor is it prepared for being transported long distances along a railway track, making the use thereof in real railway bridges completely impractical. Structures of this type, due to their different lengths and rigidities, require an adjustable supplementary static force that must be controlled by means of ballasts that are suited for each bridge. Furthermore, in certain situations it may be appropriate for dynamic testing to be performed prior to track installation to verify the structural characteristics of a new work. Accordingly, in the present invention, it is also relevant to propose an embodiment such that the apparatus can be moved to the structure in a rubber-tyred rolling vehicle.

BRIEF DESCRIPTION OF THE INVENTION

The exciter is made up of a servo-hydraulic actuator connected to a railway wagon designed for such purpose so as to be able to transport same over the tracks. The exciter can also be connected to a (towed or self-propelled) rubber-tyred vehicle suitable for circulating on a road or a line of railway or highway. The actuator generates a force by moving a variable-weight reaction mass guided by linear bearings.

The value of the reaction mass will be the function of the type of infrastructure to be analyzed by means of the application of the exciter, taking into account load requirements for the excitation. The engine design will be adapted to said requirements.

Additionally, it will comprise hydraulic equipment enabling direct transmission of the vibrations to the infrastructure, independently of the rolling gear of the wagon or the rubber-tyred vehicle, via false wheels. This is necessary to prevent wear in the rolling elements and to prevent excitation energy loss in the suspension elements of the wagon or vehicle (suspension dampers). The wagon or vehicle will allow a variable-weight ballast for the purpose of exerting variable forces of different intensity, without losing contact with the rails or the structure and where the pseudostatic effect can be reproduced.

The movement of the piston of the actuator will be controlled by a computer system programmable for such purpose, allowing the actuator to apply general forces on a bridge, such that they do not exceed the maximum acceptable displacement of the piston: harmonic, impulsive, and transient forces.

Lastly, the equipment will be equipped with the necessary load control elements to know, at all times, the force actually transmitted to the infrastructure, by means of a sensor located between the actuator and the wagon and additional sensors in the false wheels. Said sensors in the false wheels will also measure the vibratory movement of the bridge in order to know its response using the smallest number of external sensors possible.

BRIEF DESCRIPTION OF THE FIGURES

A series of drawings which help to better understand the invention, some of which are expressly related with the embodiments of said invention as non-limiting examples thereof, are very briefly described below.

EMBODIMENTS

Figure 1:
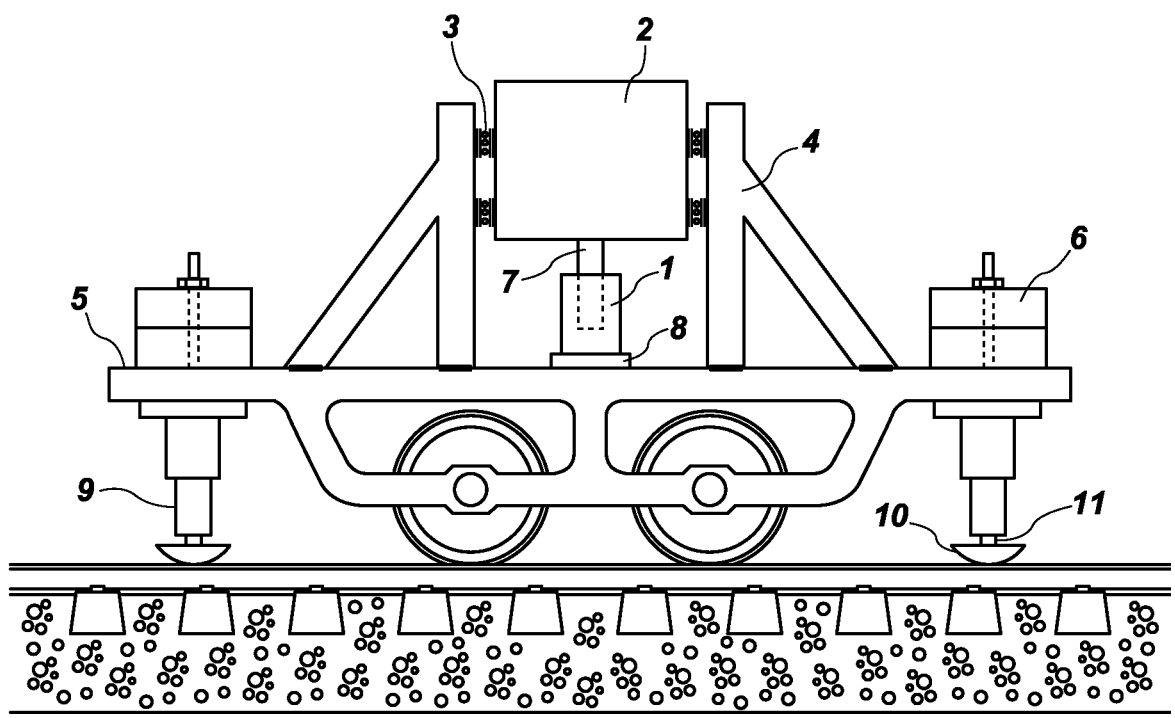
FIG. 1 shows the components making up the invention corresponding to claim 1 and derived therefrom, associated with first embodiment, in which there is observed: a railway wagon; a hydraulic actuator; a piston or plunger of the actuator; a variable-weight reaction mass; linear bearings; a frame; adjustable ballasts; sensor for detecting the aggregate measurement of the force between the actuator and the wagon; a hydraulic system for transmitting force to the track on the bridge; false wheels; force and vibration measurement sensors in the false wheels.

The preferred embodiment is shown in FIG. 1 in which a railway wagon (5) houses a frame (4) integral therewith, on which a weight-adjustable reaction mass (2) can slide vertically guided by linear bearings (3) having a very low friction. The reaction mass (2) is driven with a piston or plunger (7) which is part of the hydraulic actuator (1), the movement of the piston being controlled by means of ad-hoc software and hardware, with the functionalities necessary for producing general load functions, such that they do not exceed the maximum acceptable displacement of the piston: harmonic, impulsive, and transient forces.

The precise measurement of the load function is essential, so a novel dual device is proposed, consisting of a first aggregate sensor (8), located between the actuator (1) and the wagon (5), and additional sensors (11) directly measuring the specific force transmitted at each contact point of the machine with the train track located on the bridge. This dual device allows detecting discrepancies and thereby increases measurement quality and reliability. The direct measurement of the forces exerted on the track allows performing maintenance operations without having to clear the track of ballast, thereby saving considerable time and costs. The wagon and the track come into contact by means of false wheels (10), which are contacted with the rails by means of hydraulic actuators (9) capable of blocking vertical movement, while at the same time also blocking the suspension systems of the wagon so that they do not oscillate during movement. The sensors (11) located in the false wheels also measure the vibratory movement of the bridge in order to know its response using the smallest number of external sensors possible.

Figure 3:
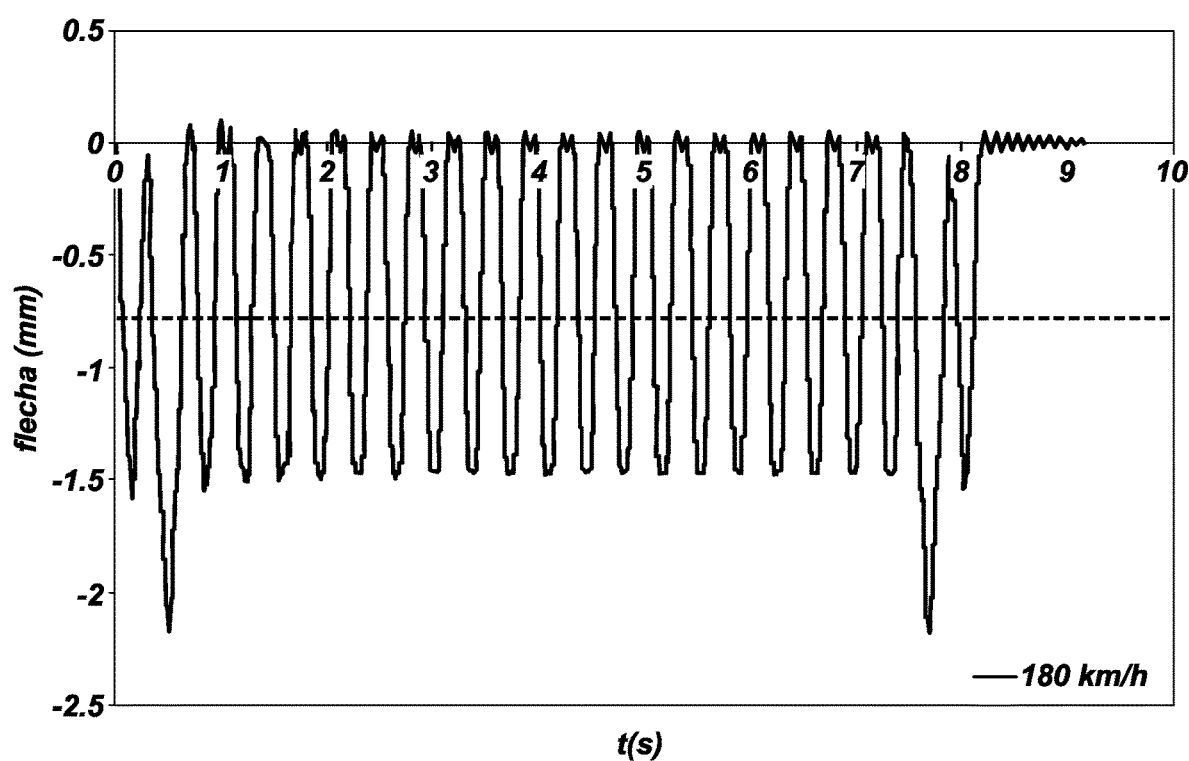
FIG. 3 shows the response (deflection in the center of the opening) of an isostatic bridge having an opening of 20 meters upon the passage of a TGV-type train circulating at 180 km/h, in which there is observed the graph of deflection as a function of time (oscillating curve) and the mean pseudostatic value thereof (horizontal line), the effect of which must be reproduced by means of the weight of a wagon or rubber-tyred vehicle supplemented by means of ballast, if necessary.

The pseudostatic effect of the weight of a train, shown in FIG. 3, is reproduced by means of the actual weight of the wagon (5), which may have to be ballasted depending on the bridge, its span, and its rigidity. For such purpose, the wagon (5) is provided with the possibility of incorporating additional ballast (6), until reaching the required weight.

Figure 2:
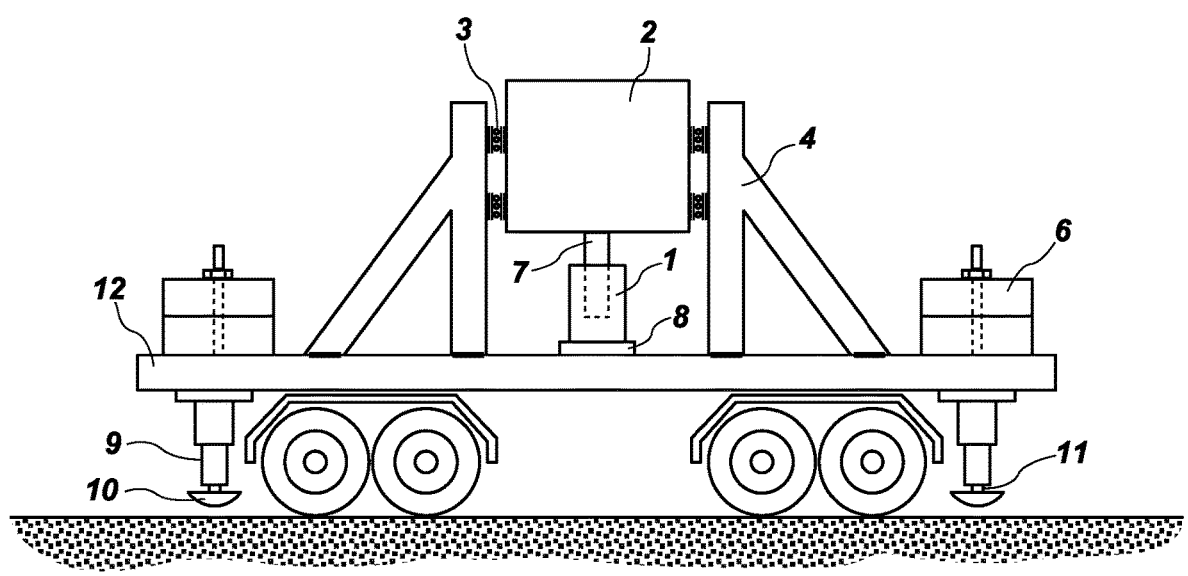
FIG. 2 shows the components making up the invention corresponding to claim 2 and derived therefrom, associated with a second embodiment, in which there is observed: a towed or self-propelled rubber-tyred vehicle; a hydraulic actuator; a piston or plunger of the actuator; a variable-weight reaction mass; linear bearings; a frame; adjustable ballasts; a sensor for detecting the aggregate measurement of the force between the actuator and the rubber-tyred vehicle; a hydraulic system for transmitting force to the structure of the bridge; false wheels; force and vibration measurement sensors in the false wheels.

A second embodiment is shown in FIG. 2 in which, in this case, it is a rubber-tyred vehicle (12) which houses the frame (4) integral therewith, on which a weight-adjustable reaction mass (2) can slide vertically guided by linear bearings (3) having a very low friction. The vehicle may be a towed or self-propelled vehicle, as appropriate. This type of vehicle makes it possible to transport the system to the bridge along a line of the railway, prior to track installation, to perform acceptance tests or tests of another type. Likewise, due to its configuration, it allows testing road bridges, if necessary.

The reaction mass (2) is driven with a piston or plunger (7) which is part of the hydraulic actuator (1), the movement of the piston being controlled by means of ad-hoc software and hardware, with the functionalities necessary for producing general load functions, such that they do not exceed the maximum acceptable displacement of the piston: harmonic, impulsive, and transient forces.

Like in the first embodiment, the precise measurement of the load function is essential, so a novel dual device is proposed, consisting of a first aggregate sensor (8), located between the actuator (1) and the rubber-tyred vehicle (12), and additional sensors (11) directly measuring the specific force transmitted at each contact point of the machine with the deck of the bridge on which it is located. This dual device allows detecting discrepancies and thereby increases measurement quality and reliability. The rubber-tyred vehicle and the bridge come into contact by means of false wheels (10), which are contacted with the deck by means of hydraulic actuators (9) capable of blocking vertical movement, while at the same time also blocking the suspension systems of the rubber-tyred vehicle so that they do not oscillate during movement. The sensors (11) located in the false wheels also measure the vibratory movement of the bridge in order to know its response using the smallest number of external sensors possible.

The pseudostatic effect of the weight of a train, shown in FIG. 3, is reproduced by means of the actual weight of the rubber-tyred vehicle (12), which may have to be ballasted depending on the bridge, its span, and its rigidity. For such purpose, the rubber-tyred vehicle (12) is provided with the possibility of incorporating additional ballast (6), until reaching the required weight.

The invention claimed is:

1. A transportable stationary bridge exciter comprising:
an actuator assembly frame supporting an actuator assembly, said actuator assembly comprising a vertical hydraulic actuator, a variable-weight reaction mass, a piston disposed therebetween, and vertically guided linear bearings, wherein said piston transmits vibrational motion from said mass to said actuator and said linear bearings reduce horizontal movement of said mass with respect to said frame;
variable weight ballast;
a moveable wagon with transport wheels, said wagon supporting said actuator assembly frame and said variable weight ballast;
a first sensor located between said actuator and said wagon; and
a vibration transmission assembly comprising adjustable vibration transmitters that prevent excitation energy loss in the suspension elements of the wagon, second sensors, and contact points, wherein the vibrational motion from said actuator is communicated through said vibration transmission assembly to an underlying structure;
wherein the movement of said piston is dynamically controlled by a computer system in response to readings from said first and second sensors.

2. The bridge exciter of claim 1 wherein said vibration transmitters are hydraulically adjustable.

3. The bridge exciter of claim 1 wherein said contact points are convex shaped.

4. The bridge exciter of claim 1 wherein said transport wheels are comprised of rubber.

5. The bridge exciter of claim 1 wherein said transport wheels are comprised of metal.

* * * * *